(12) United States Patent
Torosian

(10) Patent No.: US 9,156,649 B1
(45) Date of Patent: Oct. 13, 2015

(54) KNOT TYING KIT AND SYSTEMS

(76) Inventor: Aaron Torosian, Spokane, WA (US)

(*) Notice: Subject to any disclaimer, the term of this patent is extended or adjusted under 35 U.S.C. 154(b) by 1 day.

(21) Appl. No.: 13/608,862

(22) Filed: Sep. 10, 2012

Related U.S. Application Data

(60) Provisional application No. 61/533,907, filed on Sep. 13, 2011.

(51) Int. Cl.
*B65H 69/04* (2006.01)

(52) U.S. Cl.
CPC ..................................... *B65H 69/04* (2013.01)

(58) Field of Classification Search
USPC ................. 289/2, 13, 17, 18.1; 434/258, 260; D19/59, 62, 64
See application file for complete search history.

(56) References Cited

U.S. PATENT DOCUMENTS

| | | | | |
|---|---|---|---|---|
| 2,385,197 A | * | 9/1945 | Eisel | 434/260 |
| 2,624,957 A | | 1/1953 | Collins et al. | |
| 3,996,876 A | * | 12/1976 | Sinclair | 114/218 |
| 4,417,756 A | * | 11/1983 | Herke | 289/2 |
| 4,871,200 A | * | 10/1989 | Ryder et al. | 289/17 |
| 5,785,304 A | * | 7/1998 | Little | 269/16 |
| 6,217,086 B1 | | 4/2001 | LeTourneau | |
| D450,770 S | * | 11/2001 | Starkey | D19/62 |
| 6,485,065 B2 | | 11/2002 | Lusk et al. | |
| 6,485,307 B1 | | 11/2002 | Mestyanek | |
| D481,072 S | * | 10/2003 | Mestyanek | D19/62 |
| 8,157,297 B2 | * | 4/2012 | Spilbor et al. | 289/17 |
| 2006/0252019 A1 | | 11/2006 | Burkitt et al. | |
| 2010/0019495 A1 | | 1/2010 | Oliveto | |
| 2011/0278842 A1 | * | 11/2011 | Spilbor et al. | 289/13 |

* cited by examiner

*Primary Examiner* — Shaun R Hurley
(74) *Attorney, Agent, or Firm* — RG Patent Consulting, LLC; Rachel Gilboy

(57) ABSTRACT

Knot tying kit is a teaching and training tool that helps users to learn, improve and keep their knot tying techniques current. The kit is portable and allows users to practice dozens of types of knots.

18 Claims, 5 Drawing Sheets

KNOT TYING KIT AND SYSTEMS

CROSS-REFERENCE TO RELATED APPLICATION

The present application is related to and claims priority from prior provisional application Ser. No. 61/533,907, filed Sep. 13, 2011 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of knot tying devices and more specifically relates to a knot tying kit and system.

DESCRIPTION OF THE RELATED ART

Many individuals enjoy camping and outdoor recreation in modern society. Military personnel, scouting groups and Natural Department of Resources (NDR) may rely on knot-tying and related skills to perform necessary tasks; however without continued practice these skills may be forgotten. Additionally, many people rely on commercially-made hook and fasteners, snaps and buckles, clips to secure belongings. However, in a need or emergency situation, these modern clasps may not be readily available. When individuals are away from home on a camping expedition for example, the trip may not go smoothly if the person struggles to tie the appropriate knots for fishing, pitching a tent, climbing and first aid.

Various attempts have been made to solve the above-mentioned problems such as those found in U.S. Pat. and Pub. Nos. 2,624,957; 6,485,065; 2006/0252019; 6,217,086; 6,485,307; and 2010/0019495. This art is representative of knot tying devices. None of the above inventions and patents, taken either singly or in combination, is seen to describe the invention as claimed.

Ideally, a knot tying kit and system should provide a productive, effective means for practicing knot tying and entertainment and, yet would operate reliably and be manufactured at a modest expense. Thus, a need exists for a reliable knot tying kit and system to avoid the above-mentioned problems.

BRIEF SUMMARY OF THE INVENTION

In view of the foregoing disadvantages inherent in the known knot tying device art, the present invention provides a novel knot tying kit and system. The general purpose of the present invention, which will be described subsequently in greater detail is to provide a teaching and training tool that helps users to learn to improve and refresh their knot tying techniques.

Knot tying kit of the present invention is a teaching and training tool that helps users to learn to improve and keep their techniques refreshed. The invention may turn knot-tying into an EZ form of entertainment so users may hone their skills while having fun. The devices are non-electric, portable and allows users to try dozens of knots, so they will not be easily bored. Boy scouts, 4-H members, crafters, fishers, mountain climbers, hunters, NDR or occupational and all-season campers are just some of the consumers who may enjoy the practicality of this unique invention. User(s) may use the present invention for decorative detailing and for repairs. Some of these activities and/or knots may include loops, bends, hitches, and splices. User(s) may learn to lash to lacing or braids, weave, knits, crochet, embroidery, sew stitches, craft and leather, cable and first aid. A first aid kit included preferably comprises bandages and splints. A set—Pulley & Tackle with cable and splice may also be included.

A knot tying system is disclosed herein comprising: a lashing box having a plurality of recessed apertures; (pulley & tackle or trap-n-snare poles are not the lash box poles) a plurality of poles each having a proximate end and a distal end; and a plurality of slotted lashing holes in the lashing board. The lashing box may be flat or raised to sit above a planar surface. Each of the poles is received by one of the recessed apertures; wherein the distal end of the pole(s) is sized to fit in (into) the recessed aperture(s). The proximate end of the pole(s) each preferably comprise a knot apparatus and a trigger (which may be carved out, or slip slide notches), the knot apparatus useful for securing string about (holding it on the pole(s)), the trigger useful for releasing (for snaring, etc.); wherein the poles when inserted into the recessed apertures on the lashing board allow a user to lash string (rope, yarn, cord, or the like) about the knot apparatuses to create knot types and the slotted lashing holes for anchoring the string when lashed. The knot tying system is useful for educating user(s) in learning to manipulate and memorize (practice tying and untying) the knot types and related uses and decorative detailing of the knot types for repairs in an entertaining format.

A knot tying kit is also disclosed herein at least comprising: a lashing board (having a plurality of recessed apertures; a plurality of slotted lashing holes; and a plurality of net holes); a plurality of poles; at least one cleat; at least one hook; at least one ring; at least one eye; at least one lace vice; and at least one clamp. The knot tying kit may further comprise a net bar, a first aid kit (preferably comprising bandages and splints as well as various necessary first aid items); a plurality of braid staff (each of the braid staffs capable of being used as a marlingspike (marlingspike is the fishhook, net gauge, and braid staff); a net gauge, fishhook and optionally an all-in-one (combination) tool including at least a fish hook. The knot tying kit is useful for activities in learning to tie knots of loops, bends, hitches, splices, lashes, and lace, braids, sinnets, knits, crochets, embroidery, macramé, and sew stitches for craft and leather. The device is useful for not only practice and entertainment, but may also be used for first aid in a survival situation camping and the like. Games may also be played for competition between users for example which team or individual can tie the desired knot(s) correctly in a given time (the fastest and/or strongest, most decorative knot winning).

Sizes on the kits may comprise: Large; Knotopoly, 24×16×4 rectangled. Large Knotitus, 24×14×4 generally more ovaled. One 3:1 Lash Box, with one ring, one eye, one hook, one cleat, and one clamp, Marlingspike, carabineer, and a lacing vice. 2 net/weave rods, and pulley & tackle with cable and splice may also be included.

Middle: Knot box or hole, 12×12 square or circular to oval. One 3:1 Lash Box, one eye, ring, cleat, hook, clamp, Marlingspike, lace vice, carabineer. Two Net/Weave rods may also be included.

Small: Knot-culatuer/sistor, 6×6×3, square or oval to circler shaped. 3:1 Lash box may have one eye, ring, cleat, hook, clamp, Marlingspike, lace vice, and a carabineer. One net weave rod may also be included.

Trap-n-Snare kits: a 12" version, a second 36" version with knot apparatus one end trap other, with first aid kit with splints and bandage wraps.

The present invention holds significant improvements and serves as a knot tying kit and system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, knot tying kit and system(s), constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a knot tying device and more particularly to a knot tying kit and system as used to improve the means for teaching and training users to learn to improve and refresh their knot tying techniques.

Generally speaking, knotologist-users may use the present invention for learning knot types and their related uses in/and decorative detailing for/in repairs. These knot activities include the loops, bends, hitches, splices, lashes, cable, lace, mats, braid, sinnet or weave, knitting, crochets, embroidery, macramé, and sew stitches in crafts and leather use. The first aid kit includes the basic wrap bandages and splints, as previously mentioned.

The knot tying kit is a device with many components that may educate users about knot tying and use, which may allow them to practice learning these skills in a fun way. The invention may come in round to oval, square or rectangle shapes, desktop or portable and switchboard-like versions (these may work on a TV-style tray—all require no electricity). There are precisely nine sizes/versions. The larger rectangle version "Kontopley" may measure approximately 24" long 16" wide 4" high and may be fashioned as a tv tray or a switch board. Knotulis may be 24"×14"×4" in size and is preferably oval. The medium versions "Knothole" or "Knotbox" may measure approximately 12" round (or square). The smaller version "Knotsistor" and "Knotculater", may be at 6" long 6" wide and 2" high. These devices comprise of a box 3" or/to 6" hole, at the top and bottom the hole is used for teaching lashes of single, adjacent, triple, cross, diagonally (internal 3 vertical, 1 horizontal/diagonally) post. "All these kits" come with at least one of each of an eye and a hook screw, a ring, a cleat, clamp, carabineer, lace vice, a net and/or weave removable rods. "All kits have" an all-in-one tool for as a fish hook, net gauge, 4 braid staff and serves as a marlingspike. Larger kits come with pulley-n-tackle with cable and slice instructions, and trap-n-snare, primitive idea tools for hook, spear and/or gaff, bola and leather work instructions to make of these tools. A knot kit also comes in just (Trap-N-Snare, . . . ) four poles 12" to/or 36" with knot apparatuses on one end and the other end for traps-n-snares. The kit is to be appropriate for anyone over the age of 8 for example BSA/GSA—summer camps—age appropriate and legal in use.

Figure 1:
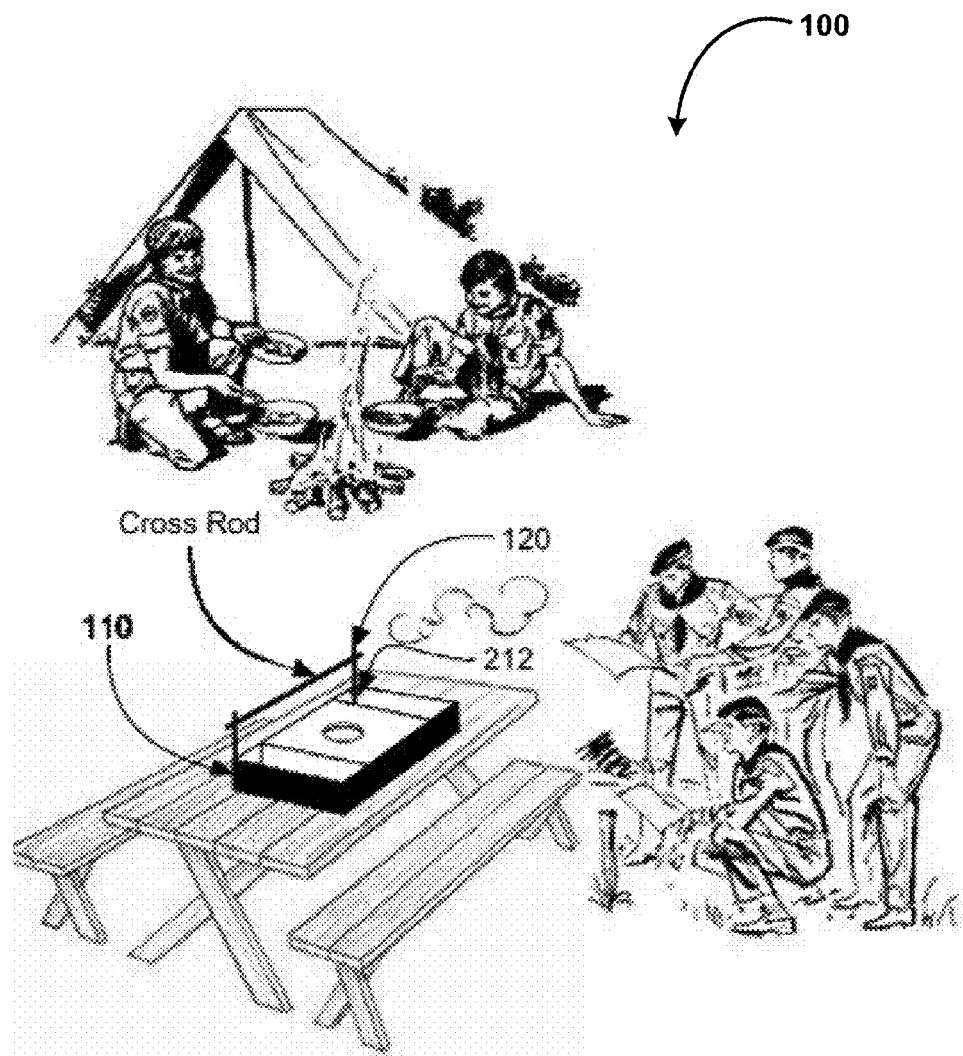
FIG. 1 shows a perspective view illustrating a knot tying kit of a knot tying system in an in-use condition according to an embodiment of the present invention.
Figure 2:
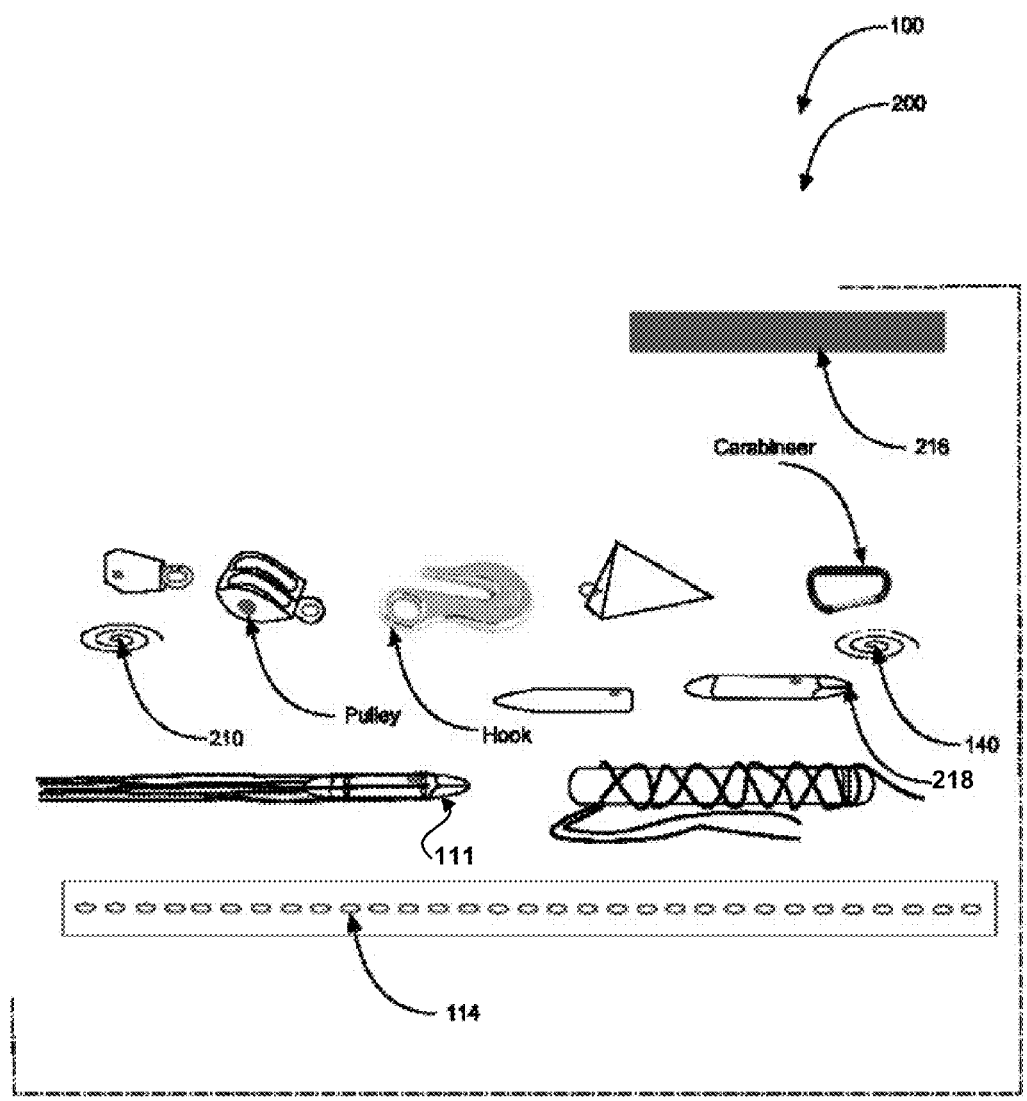
FIG. 2 is a perspective view illustrating the kit having poles, hook, pulley and various other components of the knot tying system according to an embodiment of the present invention of FIG. 1.

The following are examples of how the present invention may be used and what the system may comprise in different embodiments: Knot One, (shown later in FIG. 1) the present Knotopoly may measure about 24"×16"×4". Two 17½" poles for the pulley & tackle may be included. One cross rod 214 at 24" is included which is also useable as a net-weaving making rod, with a 24" helper rod. Each corner has a 1"×1"×2"d, post hole holder for the pulley & tackle. Left pocket inside is about 13"×5½"×3" one with each eyebolt, hook bolt, and ring. Right pocket inside is the same as left pocket, but with one cleat, two clamps, and one removable/attachable lace vice 111 (FIG. 2). Center portion is about 14"×12"×4" overall, lashing hole at 6"× (inside) 3" (4" deep overall) hole (on both sides). 4 poles are included, three horizontal, one vertical, the device has pieces that can be taken apart so size is critical. Splice box may be 6"×4" round, can be held in by the two pulley rods.

Knot Two—lash box top has a 2½"×12" (or so) in compartment for at least 4 braid strings and two splice ropes.

Knotilus, 24"×14"×3½", pulley & tackle poles 18"×1"×1", is to fit like knotoply. A 14" cross bar is included with 23, ½" holes for net and weave making (FIGS. 2-4C). The lash box is 12"×12" with a 5" or 6" hole. 4, 1¼"×11" poles are included. 8¼"×11"×3" are the dimensions of the knot tie compartment. 2½"×11" compartment for two splice ropes, 4 colored string (for Braiding), 1 for knot tying, 7 total. One lace vice attachable/removable is also included. This device may come along with the ring, eye, hook cleat, and clamp.

Figure 3:
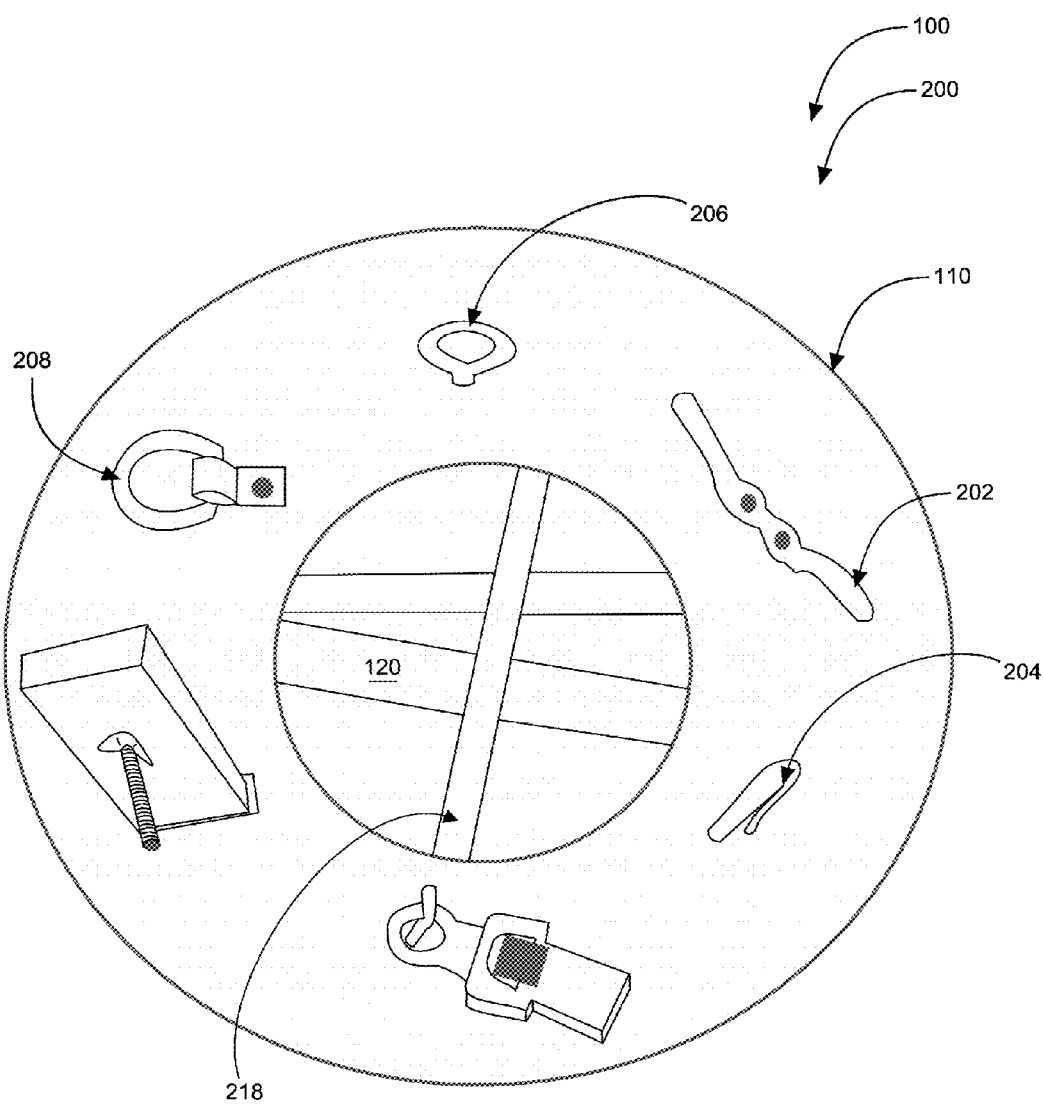
FIG. 3 is a perspective view illustrating a round version of a lashing board of the knot (hole) tying system having various components attached for ready use according to an embodiment of the present invention of FIG. 1.
Figure 4A:
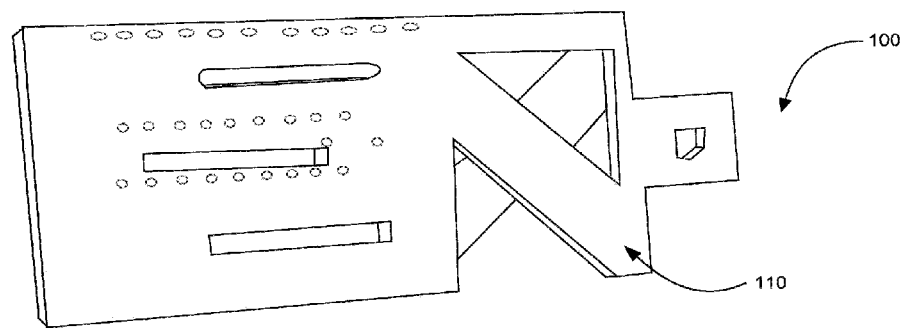
FIG. 4A is a perspective view illustrating another lashing board the knot tying system according to an embodiment of the present invention of FIG. 1.
Figure 4B:
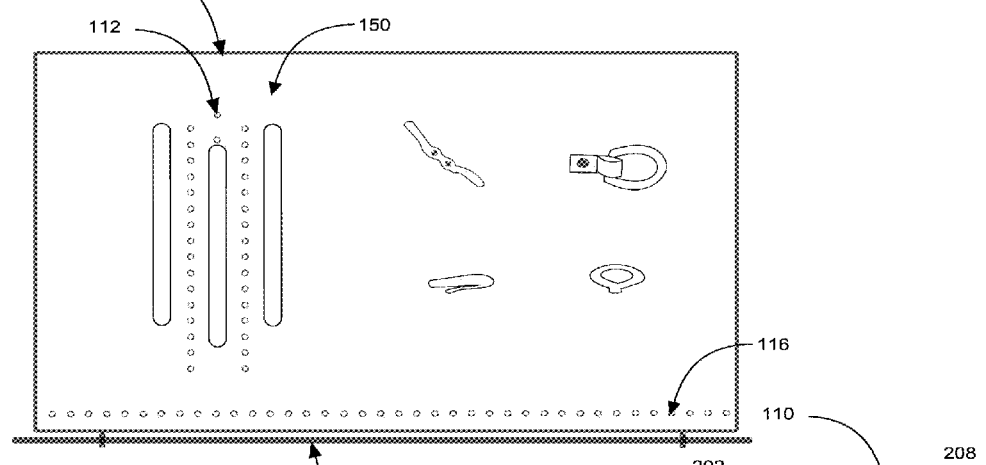
FIG. 4B is a perspective view illustrating yet another lashing board (rectangular embodiment) of the knot tying system according to an embodiment of the present invention of FIG. 1.
Figure 4C:
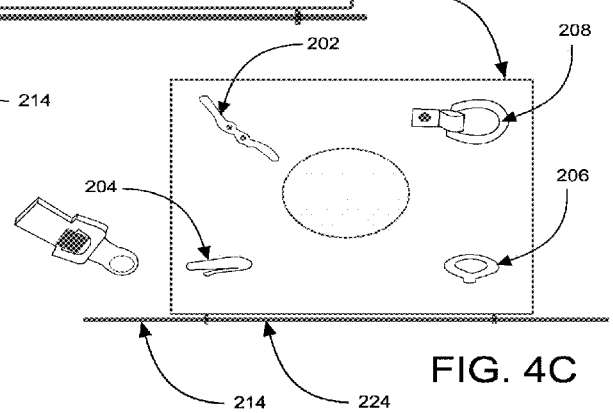
FIG. 4C is a perspective view illustrating yet another lashing board (small rectangular embodiment) the knot tying system according to an embodiment of the present invention of FIG. 1.

Knot box/hole four. 12"×12"×3" round with a 5"-6" lash hole (FIG. 3). The net pole fits across it too and is removable. This version has a lace vice, but no pulley & tackle.

Knot-culater/sistor five comprises, approx. 6"×6"×3" with a 3" hole on both sides also. Clamp attaches to the hook bolt. There is no pulley & tackle and no lace vice in this embodiment.

Knot six has in it—net and/or weave top or a bottom holder. Single Or Double size pulleys, one hook, one weight for pulley understanding is also included. Tackle for cable repair, not shown (slice clamp . . . ) and a carabineer (shown in FIG. 2). Also a 4 in 1-Marlingspike may be included. A braid rod, a fishhook for knots is included. The sizes also serves as a gauge for net hole sizing.

Now referring to the drawings more specifically by numerals of reference there is shown in FIGS. 1-5, knot tying system 100 comprising: lashing board 110 mounted on lashing box; lashing board 110 having a plurality of recessed apertures 112; a plurality of poles 120 each having proximate end 122 and distal end 124; and a plurality of slotted net/weave holes 114 (in lashing board 116) serving as an anchoring means. Additional rods can be used for weaving to make it more convenient for the user.

Each of poles 120 are received by one of recessed apertures 112; distal end 124 of pole(s) 120 designed to independently fit in (into) recessed aperture(s) 112 (preferably as a friction fit). Proximate end 122 of pole(s) 120 each comprise knot apparatus 126 and clamp 128, (knot apparatus 126 useful for securing string about. Trigger 212 is also useful during snaring and trapping situations, as mentioned subsequently. Poles 120 when inserted into recessed apertures 112 on lashing board 110 allow a user to lash string 140 (rope, cord, wire, yarn, or the like) about knot apparatuses 126 to create knot(s) (of varying) types and through slotted lashing holes 114 for anchoring string 140 when lashed. In this way knot tying system 100 is useful for educating user(s) in learning to manipulate and memorize knot types (via repeated practice) and also in related uses and decorative detailing of knot types for repairs, all in an entertaining format.

In certain embodiments lashing board 110 may comprise a switchboard-like profile 150 and is readily portable and lightweight such that it can be taken on camping trips and the like with relative ease. In alternate embodiments lashing board 110 comprises a desktop version such that it can be set on a picnic table for example and used. In preferred embodiments lashing board 110 comprises a rectangular shape (other shapes such as circular, oval, square, triangular or having more than 4 sides may be used).

Figure 5:
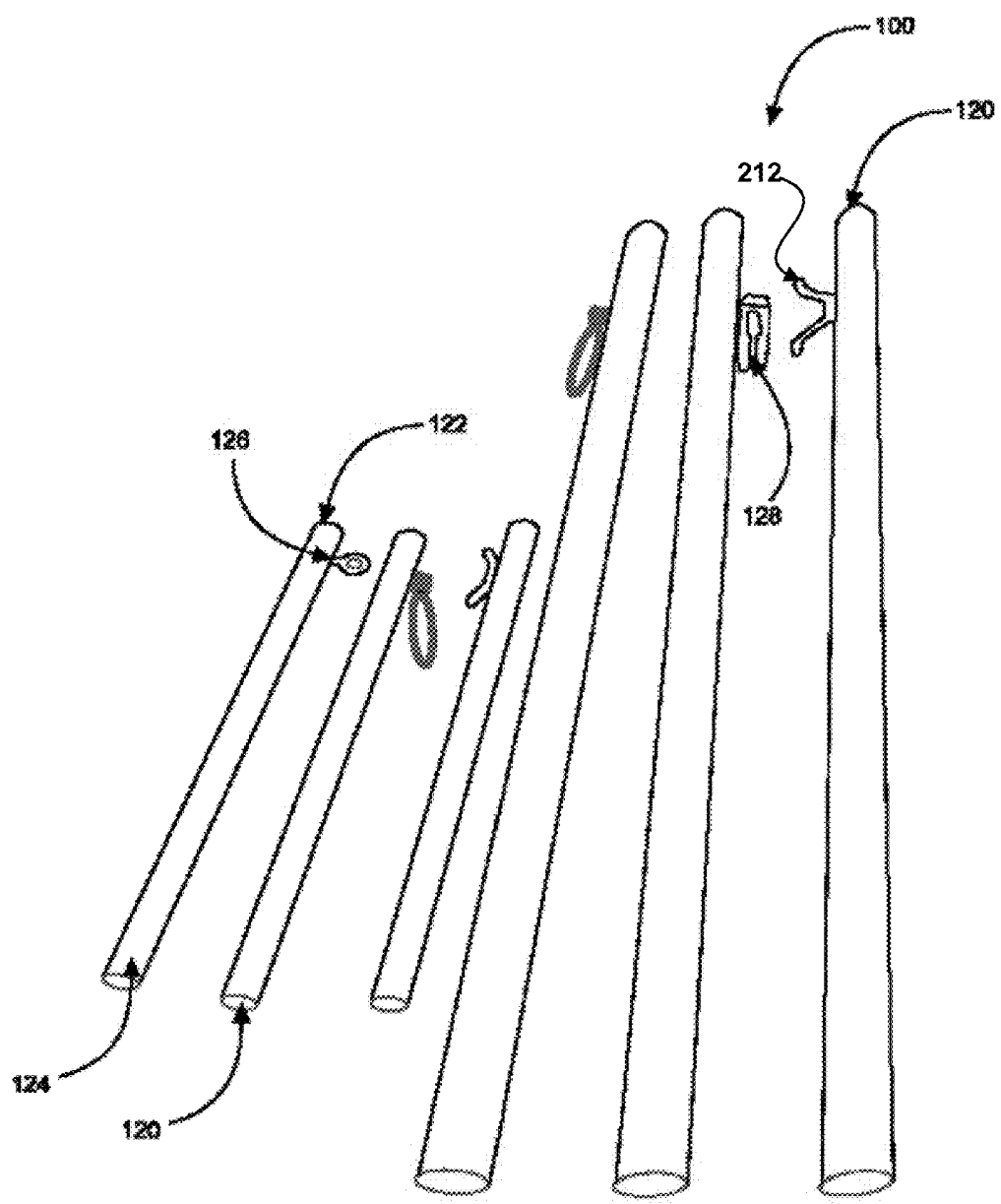
FIG. 5 is a perspective view of the trap-n-snare, pulley-n-tackle poles, lash, first aid-splint poles and attached components of the knot tying system according to an embodiment of the present invention of FIG. 1.

Small versions of lashing board 110 may comprise outer measurements of about 6" long by about 6" wide by about 2" high; medium versions may comprise outer measurements of about 12" long by about 12" wide by about 4" high; and a large version of lashing board 110 may comprise outer measurements of about 24" long by about 16" wide by about 4" high. Other dimensions may be used however these mentioned are preferred. Poles 120 may comprise a length of about 12 inches up to and including a length of about 36 inches (in two different kits) relative to the size of lashing board 110. Other sizes of poles 120 may also be available. FIG. 5 is two sets; a large and small trap-n-snare group. They may serve as first aid splints or even to teach lash, net/weave-making skill.

The knot apparatus on trigger 120 allows the knot tying system 100 to be useful for trapping and snaring (learning for a real scenario) where the device is used for survival tool, training or the like. The present invention may be carried on a backpack, RV or the like for wilderness travel and use.

Knot tying kit 200 may comprise: lashing board (box) 110 (having a plurality of recessed apertures 112; a plurality of slotted lashing board holes 114; and a plurality of net holes 116); a plurality of poles 120; at least one cleat 202; at least one hook 204; at least one ring 208; at least one eye 206; at least one pull & tack cable 210; and at least one clamp 212.

Knot tying kit 200 may further comprise net/weave 2nd bar; first aid kit 216 (preferably comprising bandages and splints BSA/GSA Red Cross qualified); a plurality of braid staffs 218; (each of braid staffs 218 capable of being used as a marlingspike); a pulley-n-tackle and trap-n-snare; and net gauge 224. Knot tying kit 200 of knot tying system 100 is useful for activities including tying knots for (or including) loops, bends, hitches, splices, lashes, lace, braids or sinnets, weaves, knits, crochets, embroidery, macramé, and sew stitches for craft and leather. Knot tying kit 200 may be used for crafts such as net or weave and the like.

Knot tying kit 200 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, more or less poles, different sized lashing boards 110, other tools and items useful for survival knowledge know how, parts may be sold separately, etc., may be sufficient. A set of user instructions for tying knots, first aid-bola-gaff-trap-n-snare- and game rules may also be included.

A method of use may comprise setting lashing board 110 (and switchboard-like profile 150) on a planar surface; inserting poles 120 into the lash box recessed apertures 112; lashing string 140 about poles 120 and to lashing board 110 through slotted lashing holes 114 to anchors and disassembling after use.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A knot tying system comprising:
   a) a lashing box providing a mounting for a lashing board including a plurality of recessed apertures;
   b) a lashing board;
   c) a plurality of net holes structured and arranged for weaving;
   a) at least one cleat;
   b) at least one hook;
   c) at least one ring;
   d) at least one eye;
   e) at least one cable;
   f) at least one clamp;
   g) at least one carabineer;
   h) a plurality of slotted lashing holes; and
   i) a plurality of poles each having a proximate end and a distal end;
   j) wherein each of said poles are received by one of said recessed apertures;
   k) wherein said distal end of said pole(s) fit in said recessed aperture(s);
   l) wherein said proximate end of said pole(s) each comprises a knot apparatus and a trigger, said knot apparatus structured and arranged for securing string about, said trigger structured and arranged for releasing;
   m) wherein said poles when inserted into said recessed apertures on said lashing box allow a user to lash said string about said knot apparatuses to create knot types and said slotted lashing holes for anchoring said string when lashed; and
   n) wherein said knot tying system is structured and arranged for educating said user in learning to manipulate and memorize said knot types and related uses and decorative detailing of said knot types for repairs in an entertaining format.

2. The knot tying system of claim 1 wherein said lashing board comprises a switchboard-like profile and is portable.

3. The knot tying system of claim 1 wherein said lashing board comprises a desktop version.

4. The knot tying system of claim 3 wherein said lashing box comprises a rectangular shape.

5. The knot tying system of claim 3 wherein a small version of said lashing box comprises outer measurements of about 6 inches long by about 6 inches wide by about 2 inches high.

6. The knot tying system of claim 3 wherein a medium version of said lashing box comprises outer measurements of about 12 inches long by about 12 inches wide by about 4 inches high.

7. The knot tying system of claim 4 wherein a large version of said lashing box comprises outer measurements of about 24 inches long by about 16 inches wide by about 4 inches high.

8. The knot tying system of claim 5 wherein said poles comprise a length of about 12 inches.

9. The knot tying system of claim 7 wherein said poles comprise a length of about 36 inches.

10. The knot tying system of claim 7 wherein said trigger allows said knot tying system to be structured and arranged for trapping and snaring.

11. The knot tying system of claim 3 wherein said lashing board comprises a circular shape.

12. The knot tying kit comprising:
    a) a lashing box mounting a lashing board having;
    b) a plurality of recessed apertures;
    c) a plurality of slotted lashing holes; and
    d) a plurality of net holes useful for weaving;
    e) a plurality of poles;
    f) at least one cleat;
    g) at least one hook;
    h) at least one ring;
    i) at least one eye;
    j) at least one cable;
    k) at least one clamp;
    l) at least one carabineer; and
    m) at least one lace vice.

13. The knot tying kit of claim 12 further comprising two net bars.

14. The knot tying kit of claim 13 further comprising a first aid kit comprising bandages, splints and instructions.

15. The knot tying kit of claim 14 further comprising a plurality of braid staffs, each of said braid staffs capable of being used as a marlingspike.

16. The knot tying kit of claim 15 further comprising a pulley-n-tackle and trap-n-snare.

17. The knot tying kit of claim 16 further comprising a net gauge.

18. The knot tying kit of claim 17 wherein said knot tying kit is useful for activities including tying knots for loops, bends, hitches, splices, lashes, lace, braids, sinnets, weaves, knits, crochets, embroidery, macramé, and sew stitches for craft and leather tasks.

* * * * *